(12) United States Patent
Rui

(10) Patent No.: US 8,190,932 B2
(45) Date of Patent: *May 29, 2012

(54) POWER SUPPLY CONVERTING CIRCUIT

(75) Inventor: Yi Rui, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 412 days.

This patent is subject to a terminal disclaimer.

(21) Appl. No.: 12/497,714

(22) Filed: Jul. 6, 2009

(65) Prior Publication Data

US 2010/0325447 A1 Dec. 23, 2010

(30) Foreign Application Priority Data

Jun. 23, 2009 (CN) .......................... 2009 1 0303548

(51) Int. Cl.
*G06F 1/00* (2006.01)
*G06F 1/26* (2006.01)
*G05F 1/00* (2006.01)
*H02M 3/335* (2006.01)
*H02M 1/12* (2006.01)

(52) U.S. Cl. ........ 713/300; 713/320; 323/271; 323/282; 363/21.1; 363/21.18; 363/26; 363/41

(58) Field of Classification Search .................. 713/300, 713/320; 323/271, 282; 363/27.1, 21, 18, 363/26, 41, 21.1, 21.18
See application file for complete search history.

(56) References Cited

U.S. PATENT DOCUMENTS

| | | | |
|---|---|---|---|
| 6,278,263 B1 * | 8/2001 | Walters et al. | 323/272 |
| 7,084,613 B2 * | 8/2006 | Harris et al. | 323/272 |
| 7,298,197 B2 * | 11/2007 | Duerbaum et al. | 327/416 |
| 7,737,672 B2 * | 6/2010 | Kudo | 323/284 |

* cited by examiner

*Primary Examiner* — Stefan Stoynov
(74) *Attorney, Agent, or Firm* — Altis Law Group, Inc.

(57) ABSTRACT

A power supply converting circuit includes a multi-phase pulse-width modulation (PWM) controller, a single-phase PWM controller, some first voltage converting circuits, a second voltage converting circuit, and an electrical switch unit. The multi-phase PWM controller provides some first PWM signals and a second PWM signal. The single-phase PWM controller provides a third PWM signal. The first voltage converting circuits receive the first PWM signals to output a first power supply to a central processing unit (CPU) chipset. The electrical switch unit receives the second and third PWM signals to selectively output the second or third PWM signal to the second voltage converting circuit to output one of the first and second power supplies, such that the second voltage converting circuit selectively outputs one of the first and second power supplies to the CPU chipset.

14 Claims, 2 Drawing Sheets

POWER SUPPLY CONVERTING CIRCUIT

BACKGROUND

1. Technical Field

The present disclosure relates to a power supply converting circuit.

2. Description of Related Art

Nowadays, central processing unit (CPU) chipsets of motherboards can be classified as two types, the first type is CPUs without an integrated graphics unit, and the second type with an integrated graphics unit. Each of the two types of CPU chipsets can be installed in a motherboard. The first type of CPU chipset only needs one power supply, called VCCP, to work. The second type of CPU chipset needs the VCCP power supply, and another power supply called V_AXG.

To accommodate the two types of CPU chipset in a motherboard, the motherboard needs to have a VCCP power supply module and a V_AXG power supply module, where the two power supply modules are independent from each other. However, if a user chooses the first type of CPU chipset, the V_AXG power supply module will be unused, therefore a voltage converting circuit (which may include a driving chip, some transistors, an inductor, and some capacitors) of the V_AXG power supply module is idle, which occupies space of the motherboard and increases costs.

DETAILED DESCRIPTION

Figure 1:
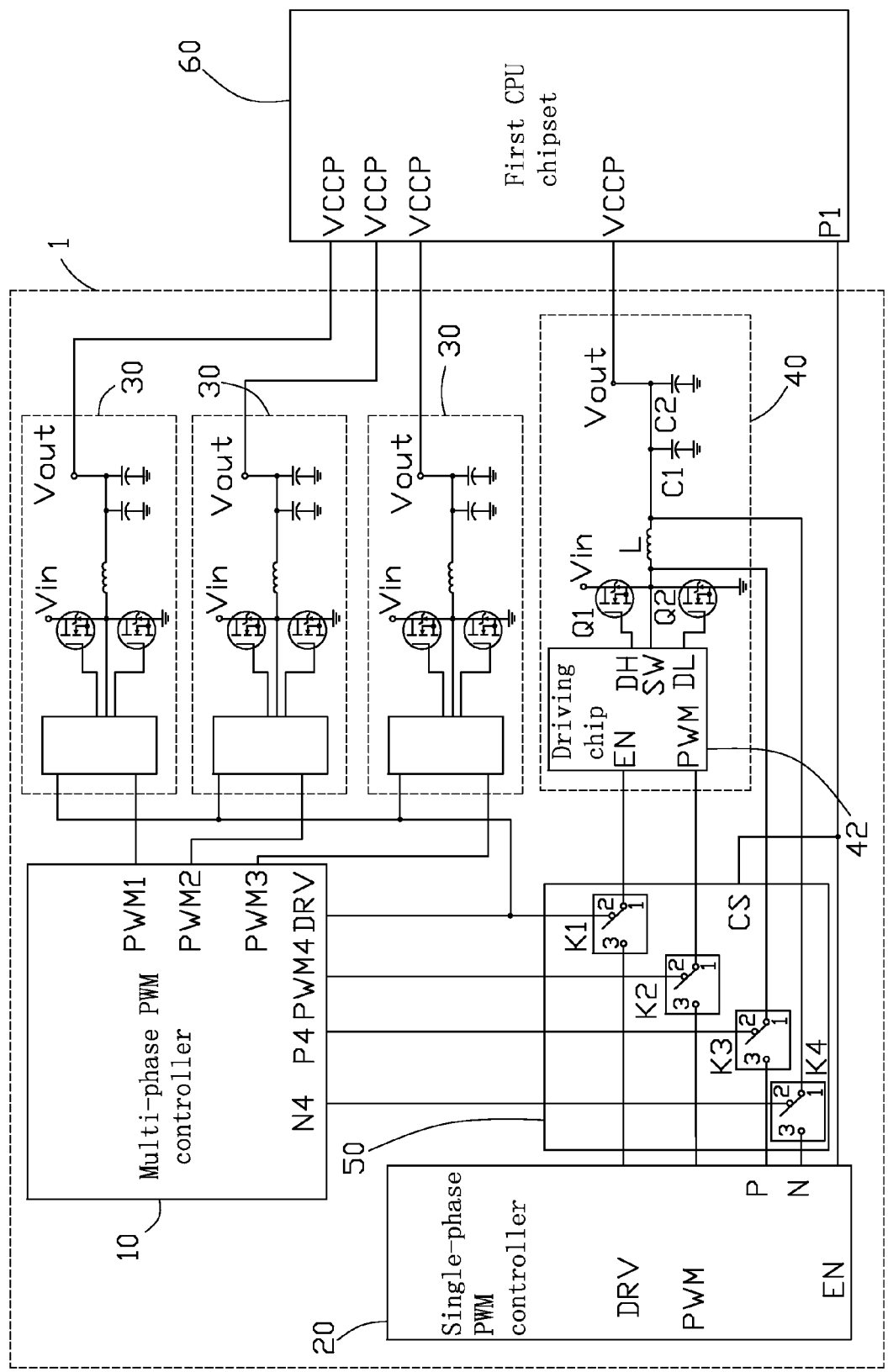
FIG. 1 is a circuit diagram of an exemplary embodiment of a power supply converting circuit, together with a first CPU chipset.
Figure 2:
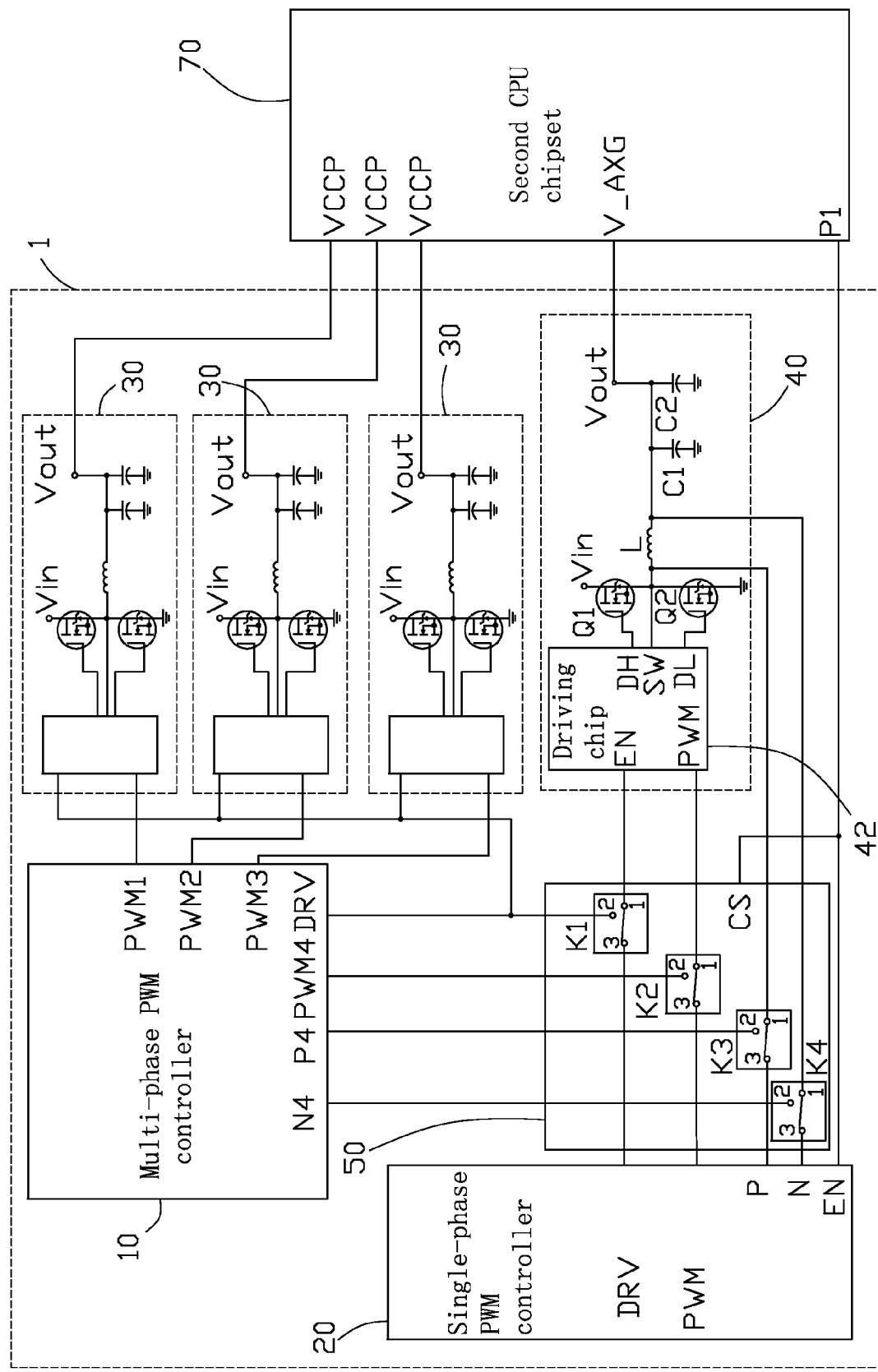
FIG. 2 is a circuit diagram of the power supply converting circuit of FIG. 1, together with a second CPU chipset.

Referring to FIGS. 1 and 2, an exemplary embodiment of a power supply converting circuit 1 is used to supply power to a first central processing unit (CPU) chipset 60 without an integrated graphics unit or a second CPU chipset 70 with an integrated graphics unit. The power supply converting circuit 1 includes a multi-phase pulse-width modulation (PWM) controller 10, a single-phase PWM controller 20, three first voltage converting circuits 30, a second voltage converting circuit 40, and an electrical switch unit 50.

The three first voltage converting circuits 30 and the second voltage converting circuit 40 supply four VCCP power supplies to four power pins VCCP of the first CPU chipset 60. The three first voltage converting circuits 30 supply three VCCP power supplies to three power pins VCCP of the second CPU chipset 70, and the second voltage converting circuit 40 supplies a V_AXG power supply to a power pin V_AXG of the second CPU chipset 70. In one embodiment, the multi-phase PWM controller 10, which is a four-phase PWM controller, provides four-phase PWM signals to the three first voltage converting circuits 30 and the second voltage converting circuits 40. In other embodiments, the number of the first voltage converting circuits 30 can be changed according to requirements, the number of the phases of the multi-phase PWM controller 10 can be changed based on the number of the first voltage converting circuits 30.

In one embodiment, the electrical switch unit 50 is an electrical switch chip including four single-pole double-throw (SPDT) switches K1-K4 and a control pin CS. The control pin CS of the electrical switch unit 50 can receive a control signal to control the four SPDT switches K1-K4. In other embodiments, the electrical switch unit 50 can be replaced by other electrical elements, such as a relay, or a transistor.

The multi-phase PWM controller 10 includes four PWM signal output terminals PWM1-PWM4, a driving terminal DRV, and four pairs of detecting terminals corresponding to the four PWM signal output terminals PWM1-PWM4. FIG. 1 only shows one pair of detecting terminals P4 and N4 corresponding to the PWM signal output terminal PWM4, and the other pairs of detecting terminals are not shown.

The single-phase PWM controller 20 includes a PWM signal output terminal PWM, a driving terminal DRV, a pair of detecting terminals P and N, and an enable terminal EN to control working states of the single-phase PWM controller 20.

Each of the first voltage converting circuits 30 and the second voltage converting circuit 40 are the same, and in FIGS. 1 and 2, only the second voltage converting circuit 40 is shown with details. Each converting circuit includes a driving chip 42, two field effect transistors (FETs) Q1 and Q2, an inductor L, two capacitors C1 and C2, a voltage input terminal Vin, and a voltage output terminal Vout. A gate of the FET Q1 is connected to a high-pass driving pin DH of the driving chip 42. A drain of the FET Q1 is connected to the voltage input terminal Vin to receive an external input voltage source (not shown). A source of the FET Q1 is connected to an output terminal SW of the driving chip 42, a drain of the FET Q2, and a first terminal of the inductor L. A gate of the FET Q2 is connected to a low-pass driving pin DL of the driving chip 42. A source of the FET Q2 is grounded. A second terminal of the inductor L is connected to the voltage output terminal Vout, and grounded via the capacitors C1 and C2 in parallel. A PWM signal receiving terminal PWM of the driving chip 42 is to receive a PWM signal. An enable terminal EN of the driving chip 42 is to receive a driving signal to drive the driving chip 42.

In one embodiment, the positions of the power pins VCCP of the first CPU chipset 60 are determined corresponding to the voltage output terminals Vout of the first voltage converting circuits 30 and the second voltage converting circuits 40. The positions of the power pins VCCP of the second CPU chipset 70 are determined corresponding to the voltage output terminals Vout of the first voltage converting circuits 30, and the position of the power pin V_AXG of the second CPU chipset 70 are determined corresponding to the voltage output terminal Vout of the second voltage converting circuits 40. That is to say, the pin positions of both chipsets 60 and 70 are adapted so that either chipset can be accommodated in the same position on a motherboard without altering the circuits.

The PWM signal output terminals PWM1-PWM3 of the multi-phase PWM controller 10 are respectively connected to the PWM signal receiving terminals PWM of the driving chips 42 of the three first voltage converting circuits 30. The driving terminal DRV of the multi-phase PWM controller 10 is connected to the enable terminals EN the driving chips 42 of the three first voltage converting circuits 30. The three first voltage converting circuits 30 receive PWM signals from the PWM signal output terminals PWM1-PWM3 of the multi-phase PWM controller 10 and receive driving signals from the driving terminal DRV of the multi-phase PWM controller 10, to output power from the three VCCP power supplies to the power pins VCCP of the first CPU chipset 60 or the second CPU chipset 70.

The PWM signal output terminal PWM4, the driving terminal DRV, and the detecting terminals P4 and N4 of the multi-phase PWM controller 10 are respectively connected to throws 2 of the SPDT switches K1-K4. The PWM signal output terminal PWM, driving terminal DRV, and the detecting terminals P and N of the single-phase PWM controller 20 are respectively connected to throws 3 of the SPDT switches K1-K4. Poles 1 of the SPDT switches K1 and K2 are respectively connected to the enable terminal EN and the PWM signal receiving terminal PWM of the driving chip 42 of the second voltage converting circuit 40. The first and second terminals of the inductor L of the second voltage converting circuit 40 are respectively connected to poles 1 of the SPDT switches K3, K4. The voltage output terminals Vout of the first voltage converting circuits 30 are connected to three power pins VCCP of the first CPU chipset 60 or the power pins VCCP of the second CPU chipset 70. The voltage output terminal Vout of the second voltage converting circuit 40 is connected to a fourth power pin of the power pins VCCP of the first CPU chipset 60 or the power pin V_AXG of the second CPU chipset 70. A control pin P1 of the first CPU chipset 60 or the second CPU chipset 70 is connected to the enable terminal EN of the single-phase PWM controller 20 and the control pin CS of the electrical switch unit 50.

In use, when the power supply converting circuit 1 is connected to the first CPU chipset 60 without an integrated graphics unit, the first CPU chipset 60 outputs a first control signal, such as a high voltage signal (e.g., a 5 V voltage signal), via the control pin P1 to the enable terminal EN of the single-phase PWM controller 20 and the control pin CS of the electrical switch unit 50. At this time, the single-phase PWM controller 20 does not work. The poles 1 are connected to the throws 2 of the SPDT switches K1-K4, respectively, therefore the three first voltage converting circuits 30 and the second voltage converting circuit 40 all output the VCCP power supplies to the power pins VCCP of the first CPU chipset 60.

When the power supply converting circuit 1 is connected to the second CPU chipset 70 with an integrated graphics unit, the second CPU chipset 70 outputs a second control signal, such as a low voltage signal (e.g., a 0 V voltage signal), via the control pin P1 to the enable terminal EN of the single-phase PWM controller 20 and the control pin CS of the electrical switch unit 50. At this time, the single-phase PWM controller 20 works. The poles 1 are connected to the throws 3 of the SPDT switches K1-K4, respectively, therefore the three first voltage converting circuits 30 output the VCCP power supplies to the power pins VCCP of the second CPU chipset 70, and the second voltage converting circuit 40 outputs the V_AXG power supply to the power pin V-AXG of the second CPU chipset 60.

In one embodiment, the detecting terminals P4 and N4 of the multi-phase PWM controller 10 and the detecting terminals P and N of the single-phase PWM controller 20 are used to detect current through the inductor L of the second voltage converting circuit 40, to determine whether the voltage converting circuit 40 is normal. In other embodiments, the multi-phase PWM controller 10 and the single-phase PWM controller 20 are combined in a single integrated circuit chip for ease of design layout of a corresponding motherboard.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power supply converting circuit to supply first and second power supplies to a central processing unit (CPU) chipset, the power supply converting circuit comprising:
   a multi-phase pulse-width modulation (PWM) controller, operable to provide a plurality of first PWM signals and a second PWM signal;
   a single-phase PWM controller, operable to provide a third PWM signal, and receive a control signal from the CPU chipset to control working states of the single-phase PWM controller;
   a plurality of first voltage converting circuits, operable to receive the plurality of first PWM signals to output the first power supply to the CPU chipset;
   a second voltage converting circuit; and
   an electrical switch unit, operable to receive the second and third PWM signals, and receive the control signal from the CPU chipset to selectively output one of the second and third PWM signals to the second voltage converting circuit, such that the second voltage converting circuit selectively outputs one of the first and second power supplies to the CPU chipset.

2. The power supply converting circuit of claim 1, wherein the number of the plurality of first PWM signals is three, and the number of the plurality of first voltage converting circuits is three.

3. The power supply converting circuit of claim 1, wherein the electrical switch unit comprises first and second single-pole double-throw (SPDT) switches and a control pin, the control pin of the electrical switch chip is to receive the control signal from the CPU chipset to control the poles of the first and second SPDT switches to be selectively connected to the first throws or second throws of the first and second SPDT switches.

4. The power supply converting circuit of claim 3, wherein two control terminals of the multi-phase PWM controller are respectively connected to first throws of the first and second SPDT switches, two control terminals of the single-phase PWM controller are respectively connected to second throws of the first and second SPDT switches, poles of the first and second SPDT switches are respectively connected to two control terminals of the second voltage converting circuit.

5. The power supply converting circuit of claim 4, wherein the two control terminals of the multi-phase PWM controller are a PWM signal output terminal and a driving terminal corresponding to the second PWM signal, the two control terminals of the single-phase PWM controller are a PWM signal output terminal and a driving terminal, the two control terminals of the second voltage converting circuit are a PWM signal receiving terminal and an enable terminal.

6. The power supply converting circuit of claim 3, wherein the electrical switch unit further comprises third and fourth SPDT switches, the control pin of the electrical switch chip is to receive the control signal from the CPU chipset to also control the poles of the third and fourth SPDT switches to be selectively connected to the first throws or second throws of the third and fourth SPDT switches.

7. The power supply converting circuit of claim 6, wherein two detecting terminals of the multi-phase PWM controller are respectively connected to first throws of the third and fourth SPDT switches, two detecting terminals of the single-phase PWM controller are respectively connected to second throws of the third and fourth SPDT switches, poles of the third and fourth SPDT switches are respectively connected to two detecting terminals of the second voltage converting circuit.

8. The power supply converting circuit of claim 1, wherein each of the first and second voltage converting circuits includes a driving chip, first and second field effect transistors (FETs), an inductor, a voltage input terminal, and a voltage output terminal, an enable terminal of the driving chip is to receive a driving signal to drive the driving chip to output the first or second power supply via the inductor.

9. The power supply converting circuit of claim 8, wherein the first FET receives a high-pass driving signal from the driving chip, the second FET receives a low-pass driving signal from the driving chip, the inductor receives an output signal from an output terminal of the driving chip, and the driving chip receives the second or third PWM signal.

10. The power supply converting circuit of claim 9, wherein a gate of the first FET is connected to a high-pass driving pin of the driving chip, a drain of the first FET is connected to the voltage input terminal, a source of the first FET is connected to the output terminal of the driving chip.

11. The power supply converting circuit of claim 9, wherein a gate of the second FET is connected to a low-pass driving pin of the driving chip, a source of the second FET is grounded, a drain of the second FET is connected to the output terminal of the driving chip.

12. The power supply converting circuit of claim 8, wherein a plurality of PWM signal output terminals of the multi-phase PWM controller are respectively connected to PWM signal receiving terminals of the driving chips of the plurality of first voltage converting circuits, a plurality of driving terminals of the multi-phase PWM controller are respectively connected to enable terminals of the driving chips of the plurality of first voltage converting circuits.

13. The power supply converting circuit of claim 1, wherein an enable terminal of the single-phase PWM controller and a control pin of the electrical switch unit are connected to a control pin of the CPU chipset, to receive the control signal from the CPU chipset.

14. The power supply converting circuit of claim 1, wherein the multi-phase PWM controller and the single-phase PWM controller are combined in a single integrated circuit chip.

* * * * *